United States Patent [19]
Munoz

[11] Patent Number: 5,285,875
[45] Date of Patent: Feb. 15, 1994

[54] IMPACT SENSITIVE SHOCK ABSORBER

[75] Inventor: Carlos H. Munoz, Placentia, Calif.

[73] Assignee: Nissan Research & Development, Inc., Plymouth, Mich.

[21] Appl. No.: 797,357

[22] Filed: Nov. 25, 1991

Related U.S. Application Data

[63] Continuation-in-part of Ser. No. 622,864, Dec. 5, 1990, abandoned.

[51] Int. Cl.$^5$ ............................................. F16F 9/50
[52] U.S. Cl. ................................. 188/275; 188/315
[58] Field of Search ............. 188/275, 279, 281, 380, 188/286, 315, 318, 320, 283, 322.13, 322.16, 322.19, 322.21, 141; 303/24.1

[56] References Cited

U.S. PATENT DOCUMENTS

| | | | |
|---|---|---|---|
| 2,802,675 | 8/1957 | Ross | 188/315 X |
| 3,127,958 | 4/1964 | Szostak | 188/275 |
| 3,338,347 | 8/1967 | Avner | 188/275 |
| 3,621,950 | 11/1971 | Lutz | 188/315 |

FOREIGN PATENT DOCUMENTS

| | | | |
|---|---|---|---|
| 1007122 | 4/1957 | Fed. Rep. of Germany | 188/315 |
| 1146312 | 3/1963 | Fed. Rep. of Germany | 188/315 |
| 1125267 | 10/1956 | France | 188/275 |
| 1414351 | 9/1965 | France | 188/315 |
| 0050475 | 4/1977 | Japan | 188/281 |

*Primary Examiner*—Robert J. Oberleitner
*Assistant Examiner*—Josie A. Ballato
*Attorney, Agent, or Firm*—Foley & Lardner

[57] ABSTRACT

The shock absorber has a housing containing a damping chamber, a shock absorber piston mounted for movement in the chamber and an inertia operated damping control valve in the damping chamber for altering a damping factor of the piston movement in the chamber in response to a shock input or in response to an aceleration of the shock absorber. The damping chamber comprises a cylindrical housing and the inertia operated damping control valve comprises an orifice in the damping chamber housing, a pivotable valve member positioned to cover the orifice and a resilient member for biasing the movable valve member over the orifice. The damping chamber housing is oriented generally vertically and the resilient member is positioned between the cylindrical housing and the valve member.

16 Claims, 6 Drawing Sheets

IMPACT SENSITIVE SHOCK ABSORBER

CROSS REFERENCE

This application is a continuation-in-part of U.S. Ser. No. 07/622,864 which was filed on Dec. 5, 1990, now abandoned.

BACKGROUND OF THE INVENTION

1. Field of the Invention

This invention relates to shock absorbers and especially to shock absorbers which can be adapted to provide variable damping factors depending on road surface conditions.

2. Discussion of Related Art

Conventional shock absorbers impose a typical compromise between ride quality and handling performance. Usually the high damping required for good handling is excessive for acceptable ride quality on most roads which produce significant vertical impacts. The compromise usually is to adjust the compression damping of the shock absorber to 25%–40% of the extension damping to prevent excessive forces being transmitted during impactive compression strokes. This compromise resolves some of the severity of rough road impacts but still presents problems with ride and handling.

Shock absorbers have been suggested which have a variable damping ratio controlled by a ride or road sensor. In response to the output of the sensor, a control circuit adjusts the damping of the shock absorber to provide a smooth ride. Such systems, however, require complicated and costly controls to function properly.

SUMMARY OF THE INVENTION

An object of the present invention is to provide a variable damping factor shock absorber which automatically adjusts it own damping factor in response to input shocks, but requires no complicated controls to operate.

Another object of the present invention is to provide a variable damping factor shock absorber which is self contained.

A further object of the present invention is to provide a variable damping factor shock absorber which has a minimum of moving parts to increase reliability.

Another object of the present invention is to provide a variable damping factor shock absorber which takes advantage of conventionally available components to the greatest extent possible.

In accordance with the above and other objects, the present invention comprises a shock absorber housing containing a damping chamber, a shock absorber piston mounted for movement in the chamber and an inertia operated damping control valve in the damping chamber for altering a damping factor of the piston movement in the chamber in response to an impactive input.

In accordance with other objects, the damping chamber comprises a cylindrical wall and the inertia operated damping control valve comprises an orifice in the damping chamber wall, a movable valve member positioned so as to be able to cover and uncover the orifice and a resilient member for biasing the movable valve member over the orifice.

In a first embodiment, the damping chamber housing is oriented generally vertically and the resilient member is positioned below the movable valve member.

In both embodiments, the damping chamber comprises a wall inside the shock absorber housing to form an oil reservoir and a fluid pressure responsive base valve is positioned at the bottom of the chamber for communicating the damping chamber with the oil reservoir. The inertia operated damping control valve forms a second passage between the damping chamber and the oil reservoir.

The end of the piston is sealed against the chamber to divide the chamber into an upper chamber and a lower chamber. A fluid pressure responsive piston valve is mounted to the piston end for communicating the upper chamber to the lower chamber.

In accordance with other objects, the second embodiment's movable valve member is a pivotable valve member which pivots in response to an impactive force in order to cover and uncover the orifice.

Still another object of both embodiments of the invention is to provide a variable damping factor shock absorber which automatically adjusts its own damping factor in response to acceleration of the shock absorber, along its longitudinal axis.

In accordance with the above objectives, the second embodiment includes a shock absorber housing containing a damping chamber, a shock absorber piston mounted for movement in the chamber and an inertia operated damping control valve in the damping chamber for altering the damping factor in response to an acceleration of the shock absorber in a direction transverse to the longitudinal axis of the shock absorber.

BRIEF DESCRIPTION OF THE DRAWINGS

The above and other objects of the invention will become more readily apparent as the invention is more fully understood from the detailed description below, reference being had to the accompanying drawings in which like reference numerals represent like parts throughout and in which.

DETAILED DESCRIPTION OF THE PREFERRED EMBODIMENTS

Figure 1:
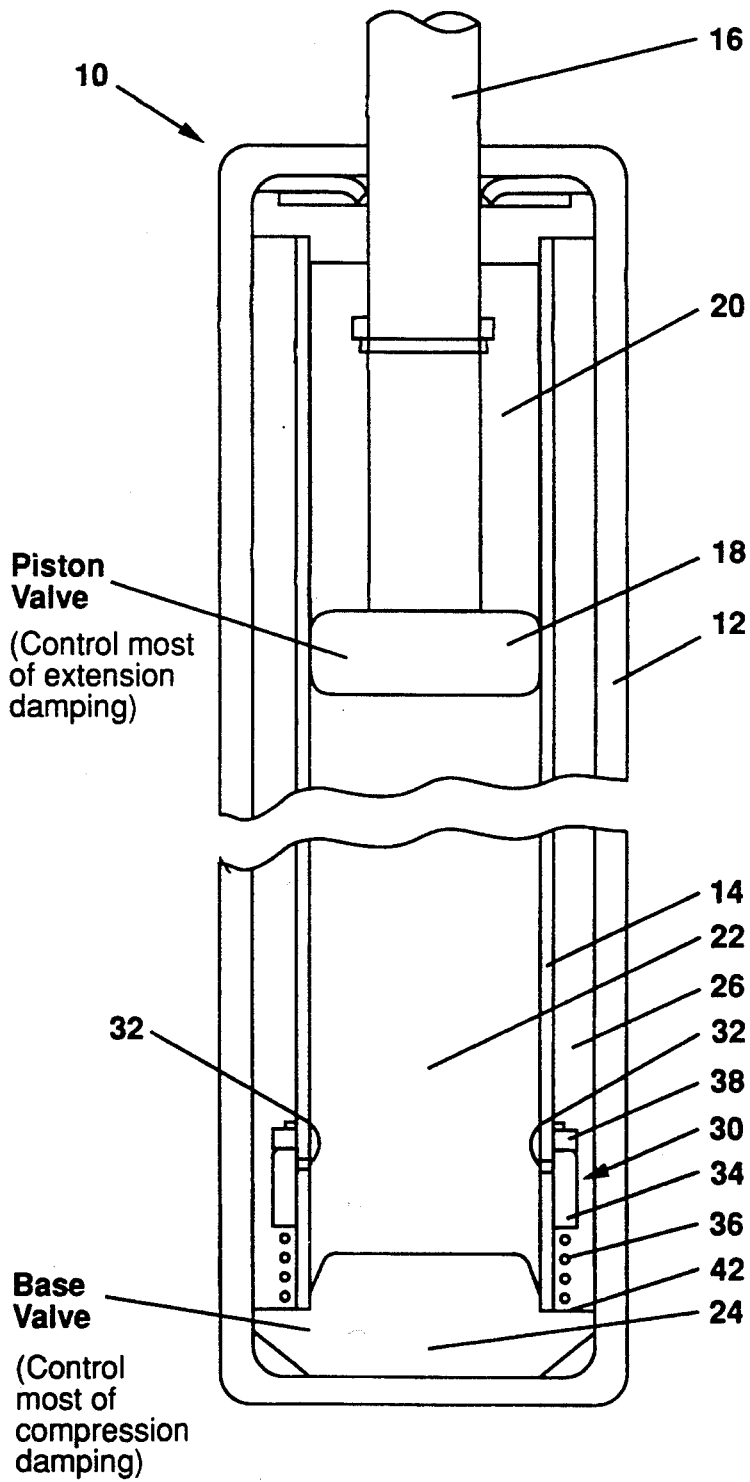
FIG. 1 is cross sectional view of a shock absorber according to the present invention.

FIG. 1 shows the construction of a shock absorber 10 according to the present invention. Shock absorber 10 comprises a housing 12 which is generally cylindrical with an enclosed top and bottom. Within the housing 12 is a cylindrical damping chamber 14 which is filled with fluid and receives a piston 16. At the end of piston 16 there is a conventional piston valve 18 which is sealed against the wall of chamber 14 to divide the chamber into an upper chamber 20 and a lower chamber 22. The piston valve 18 is designed to communicate the upper chamber 20 with the lower chamber 22 in response to fluid pressure. A base valve 24 is mounted at the bottom of lower chamber 22 and is responsive to fluid pressure to provide communication between lower chamber 24 and a partially filled oil reservoir 26 defined between chamber 14 and housing 12.

The elements discussed above form a double action conventional shock absorber whose operation is well known and will not be described in detail here. This conventional operation includes compressive damping resulting from a compressive force applied to the piston 16 causing sufficient fluid pressure to open valve 24, allowing fluid to pass through a restriction from the lower chamber 22 to the oil reservoir 26 and also into the upper chamber 20 through valve 18. The amount of the restriction in valve 24 and, to a lesser amount valve 18, determines the compressive damping factor. Extension damping is effected when the piston 16 is extended, causing fluid pressure in upper chamber 20 to open the piston valve 18 and pass through a restriction into lower chamber 22. The extension damping factor is determined by the amount of the restriction in the piston valve.

According to the present invention, in addition to the conventional valves, an inertial valve 30 is provided. Valve 30 comprises a plurality of orifices 32 in the wall of chamber 14 to provide communication between the lower chamber 22 and oil reservoir 26. A movable annular ring 34 is sealingly fitted about the outer periphery of the chamber 14, and can slide up and down on the chamber wall. A spring 36, which is also annular in shape, extends around the wall of chamber 14 and biases the ring 34 upwardly against a stop 38. In its upper position, the ring 34 covers the orifices 32. When ring 34 is moved downward against the bias of spring 36, orifices 32 are opened and the ring may contact bottom stop 42. Rings 38 and 42 are made of elastomeric material to attenuate noise.

Figure 2:
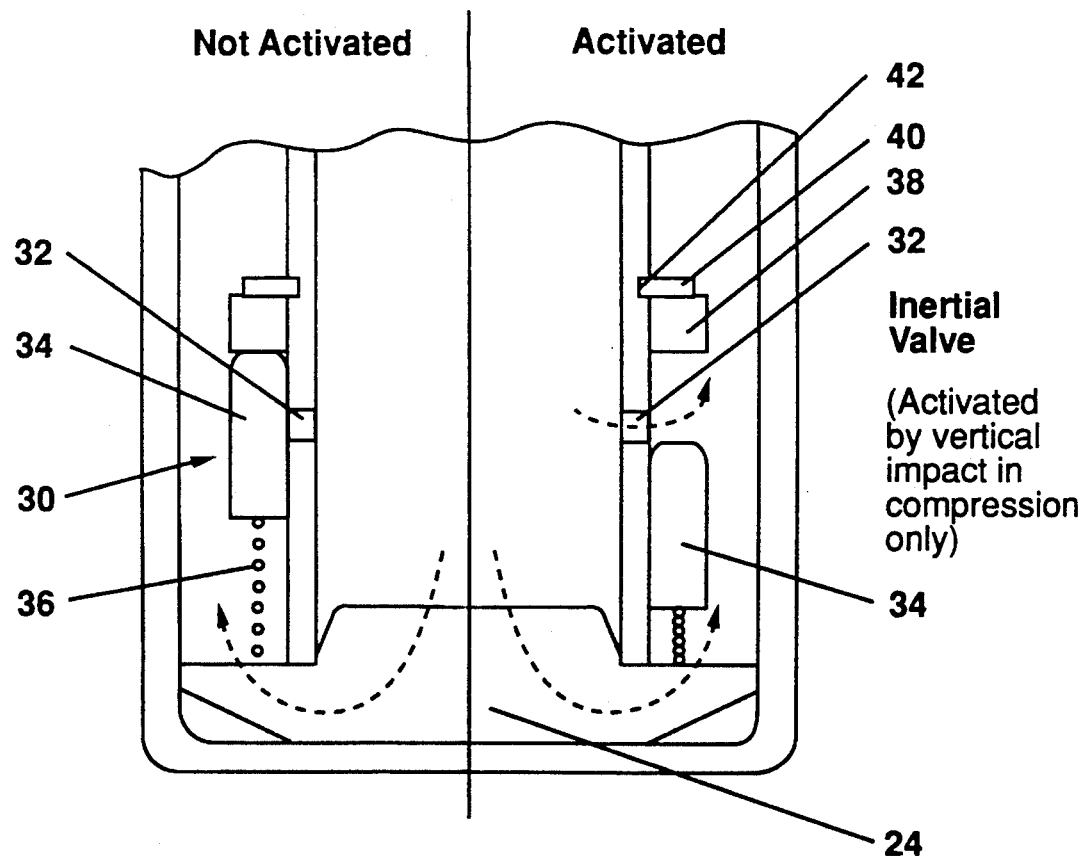
FIG. 2 is a part fragmentary cross sectional view of the shock absorber according to the present invention showing on the left the inactivated position of the damping control valve and, on the right, the position of the activated control valve.

FIG. 2 shows the construction and operation of the inertial valve in greater detail. As can be seen, the stop member 38, which is a ring encircling the chamber 14, is held in position by a retaining ring 40 which seats in a recess 42 in the wall of the chamber 14.

The left side of FIG. 2 shows the inertial valve 30 in its inactive position. In this position, orifices 32 are not opened and the compressive damping factor of the shock absorber is determined by the base valve 24 in the conventional manner. However, when the shock absorber experiences a strong upward impact resulting in upward movement, the inertia of movable ring 34 delays its motion causing relative displacement between the ring 34 and the wall of chamber 14. If the impact is sufficiently strong, as determined by the mass of ring 34 and the spring constant of spring 36, movement of the shock absorber causes displacement the ring 34 to open orifices 32, resulting in a secondary flow path for the fluid in lo lower chamber 22. In this manner, the compressive damping factor is lowered under extreme shock load conditions. The amount of the reduction is determined by the size and number of orifices 32 and their rate of opening.

Figure 3A:
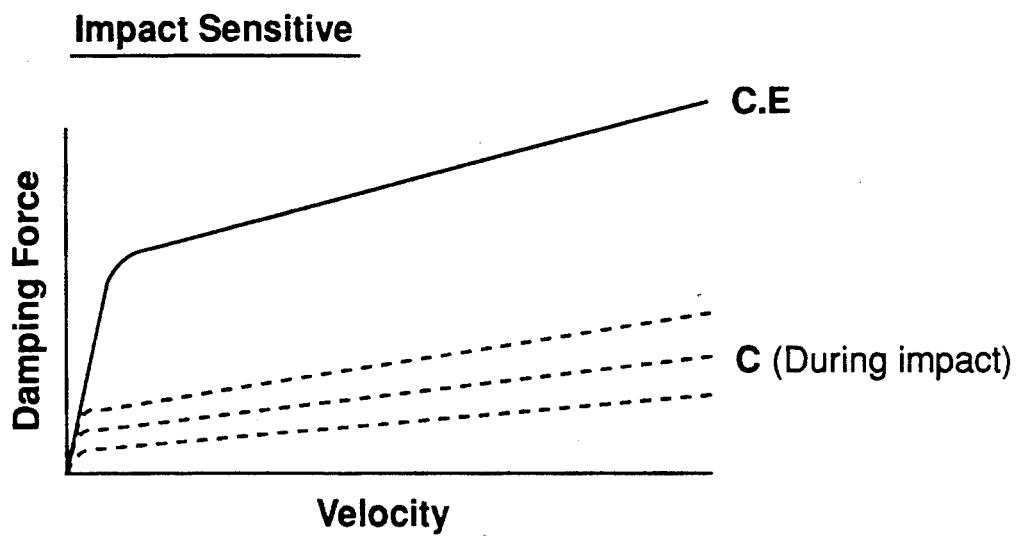
FIG. 3a is a graph of damping force v velocity for the shock absorber of the present invention.

FIG. 3a shows the variable damping characteristics for the present invention. As shown by the solid line, the compression and extension damping factors can be equal if desired when the inertial valve is closed. On the other hand, during impact, the compression damping factor is substantially reduced. The amount of the reduction and the point of valve opening are design considerations to be determined in accordance the particular vehicle involved.

Figure 3B:
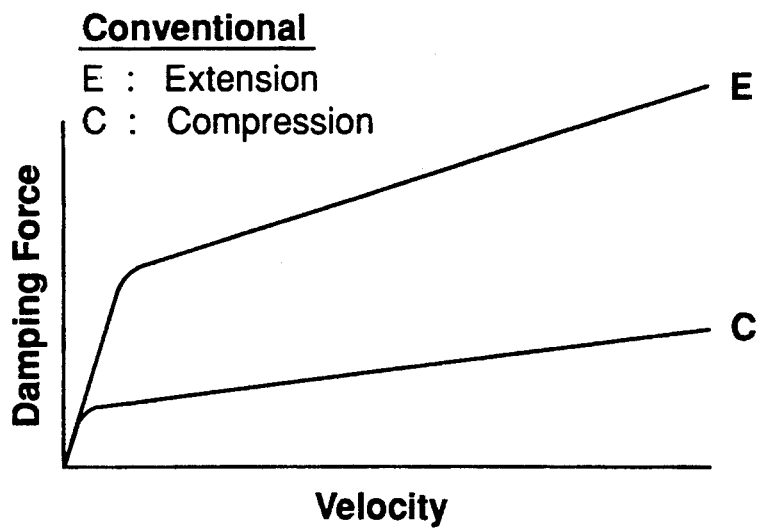
FIG. 3b is a graph of damping force v. velocity for a conventional shock absorber.

The characteristics of FIG. 3a are to be compared with a conventional shock absorber, whose characteristics are shown in FIG. 3b. Here it can be seen that the extension damping factor is significantly higher, on the order of 2 to 4 times greater, than the compressive damping factor, as a typical compromise between ride quality and handling performance.

According to the present invention, the damping factor for both compression and extension in the absence of impact is about the same as the extension damping factor of the conventional device. On the other hand, the impact compression damping of the invention is less than the compression damping of the conventional device, allowing less impactive force to be transmitted to the vehicle.

Figure 4A:
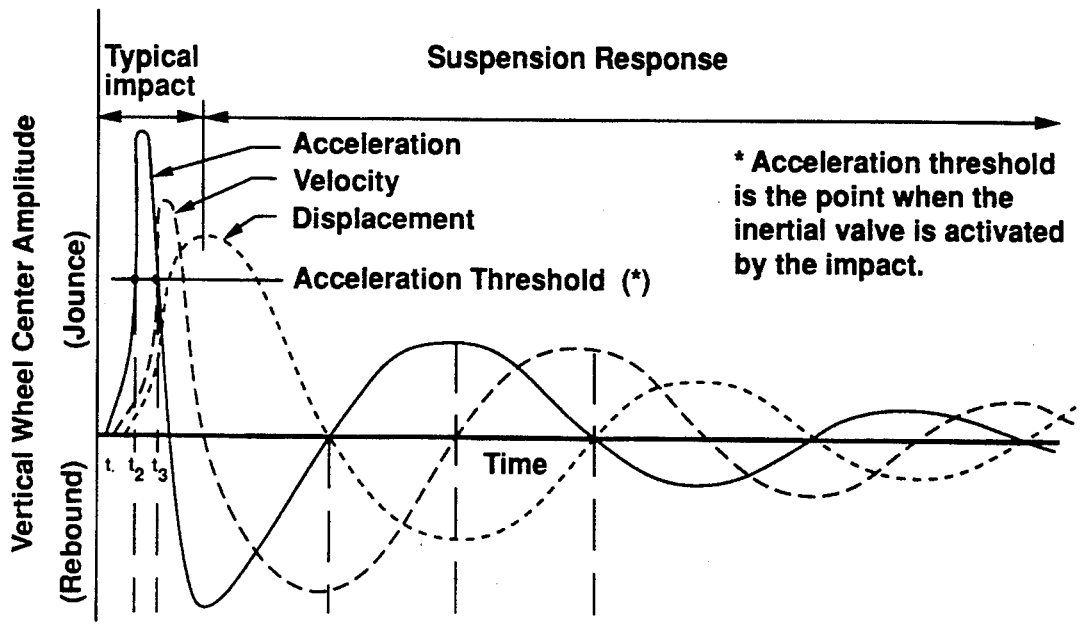
FIG. 4a is a graph of vertical wheel center amplitude v. time useful in understanding the operation of the present invention.
Figure 4B:
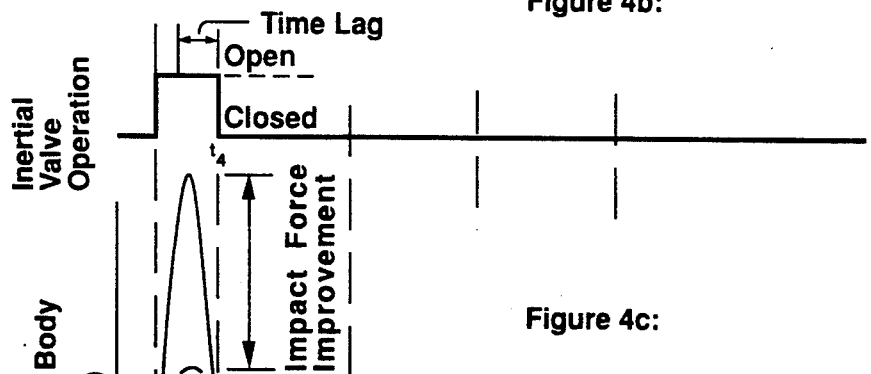
FIG. 4b is a graph of inertial valve operation v. time useful in understanding the operation of the present invention.
Figure 4C:
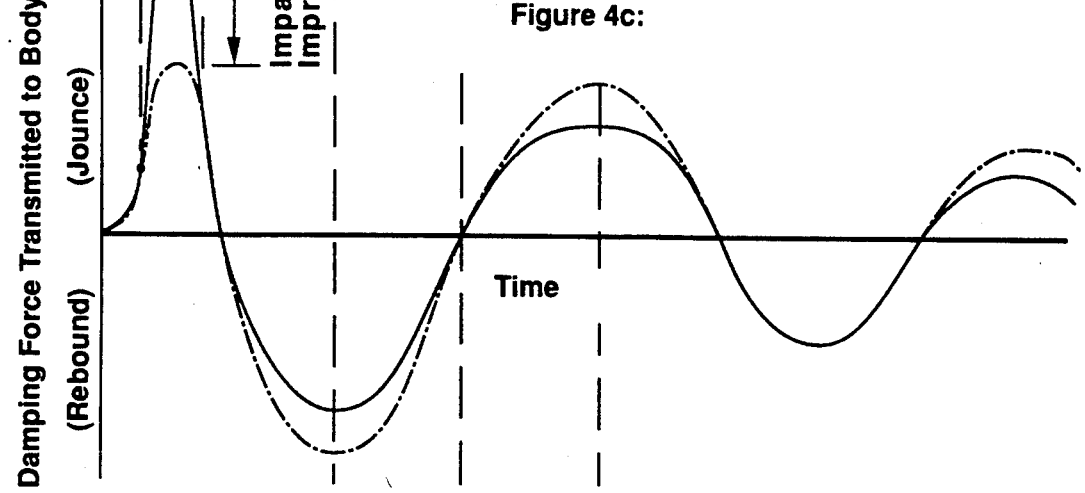
FIG. 4c is a graph of damping force transmitted to body v. time showing operation of a conventional shock absorber as compared to the shock absorber of the present invention.

FIGS. 4a, 4b and 4c show a comparison of the results of damping a large impact using the present invention as compared to a conventional shock absorber As seen in FIG. 4a, the wheel movement of a conventional vehicle experiences a sudden large acceleration at time t1, representing a sudden bump in the road. The acceleration of the wheel is shown by the solid line, while wheel velocity is shown by the longer dashed line and wheel displacement is shown by the shorter dashed line. At time t2, the acceleration reaches the threshold at which the inertial valve 30 of the present invention opens. At time t3, the acceleration reduces below this threshold. Beyond time t3, the residual oscillatory jounce and rebound movement of the wheel resulting from the initial shock is shown.

In FIG. 4b, it can be seen that at time t2, the valve 30 opens. However, there is a time lag between time t3 and the closing of the valve 30 at time t4. This time lag is due to inertial effects.

FIG. 4c shows the force transmitted to the vehicle body. In this figure, the solid line represents the force transmitted through a conventional shock absorber and the dot-dash line represents the force transmitted through a shock absorber according to the present invention. As can be seen, Between times t2 and t3, when the inertial valve is open, the transmitted force through the invention is substantially reduced as compared to a conventional shock absorber, whereas during the remainder of the jounce and rebound period resulting from the initial shock, the transmitted force is about the same. It will be noted that slightly more force is transmitted during the first rebound period with the invention as compared to the conventional shock absorber since so much more energy was dissipated by the conventional shock absorber during the first jounce period. Slightly more force is transmitted during the subsequent jounce periods due to the greater compression damping factor of the invention. However, the actual difference in transmitted force after the initial jounce period is minimal. Hence, it can be seen that the present invention affords substantially increased riding comfort as compared to a conventional shock absorber.

In addition, the shock absorber of the present invention provides a better ride over a rough road due to its having the same compression and extension damping factors in the absence of a large impact. In a conventional shock absorber where extension damping is 2 to 4 times larger than compression damping a push down effect results because on the average, the compression forces are weaker than the extension forces. The vehicle then behaves as if it carries extra loads. On rough roads the bound bumpers of the suspension continuously make contact resulting in poor ride quality even with light loading. The equalized compression and extension damping factors of the present invention eliminate this problem.

Figure 5:
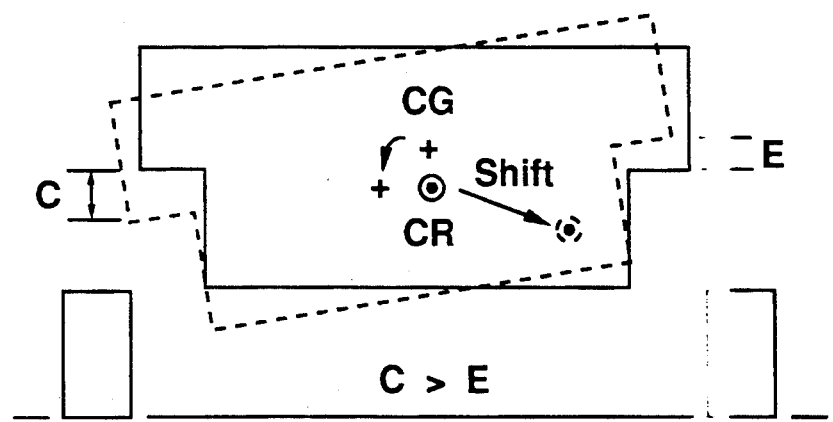
FIG. 5 schematically shows the attitude change caused by a conventional shock absorber during vehicle operation under a lateral load.

In addition, the large differences in compression and extension damping of a conventional shock absorber affect vehicle performance during transient handling phenomena such as single and double lane changes. When a quick input to the steering is applied, the vehicle initiates a roll movement. However, when compression damping is weaker than extension damping, the vehicle seems to "fall sideways" sometimes faster than anticipated. This effect can be better understood with respect to FIG. 5 which shows a vehicle under lateral load using a conventional shock absorber. As can be seen, the outside-of-the turn suspension compresses more than the extension of the other side and the dynamic center of rotation (CR) shifts inward while the center of gravity (CG) drops creating the "fall sideways" sensation. To improve this condition stronger stabilizer bars are the usual practice, but this also deteriorates ride quality. This is because the center of rotation (CR) or "roll center height" of the front and rear suspension is determined by the suspension geometry from a purely kinematic point of view. Under dynamic conditions, however, nonlinearities of the suspension components such as temporary sticking by friction, hysteresis, variable rate springs or unequal compression or extension characteristics of shock absorbers can significantly alter the classical kinematic assumption of roll center height location.

Figure 6:
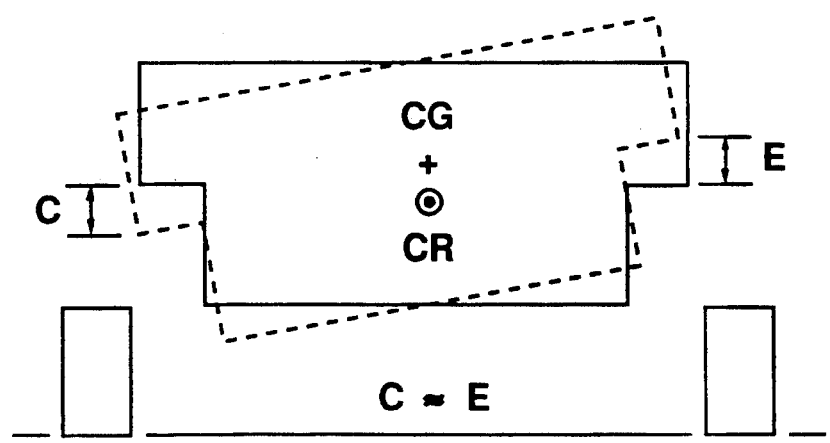
FIG. 6 schematically shows the attitude change caused by the shock absorber of the present invention during vehicle operation under a lateral load.

FIG. 6 shows that, using the present invention in which compression and extension damping can be made equal in absence of strong impact, the center of rotation (CR) does not shift and the problems of the conventional shock absorber are avoided.

Another handling problem avoided by the present invention is bottoming on a turn. This is one of the most undesirable effects of low compression damping. In this case, unpredictable handling occurs when the outside-of-the-turn tire experiences sudden loading changes as a result of bottoming or contacting the bound bumpers. This condition usually occurs during avoidance maneuvers or when cornering on bumpy roads. This condition is also avoided using the present invention.

Figure 7:
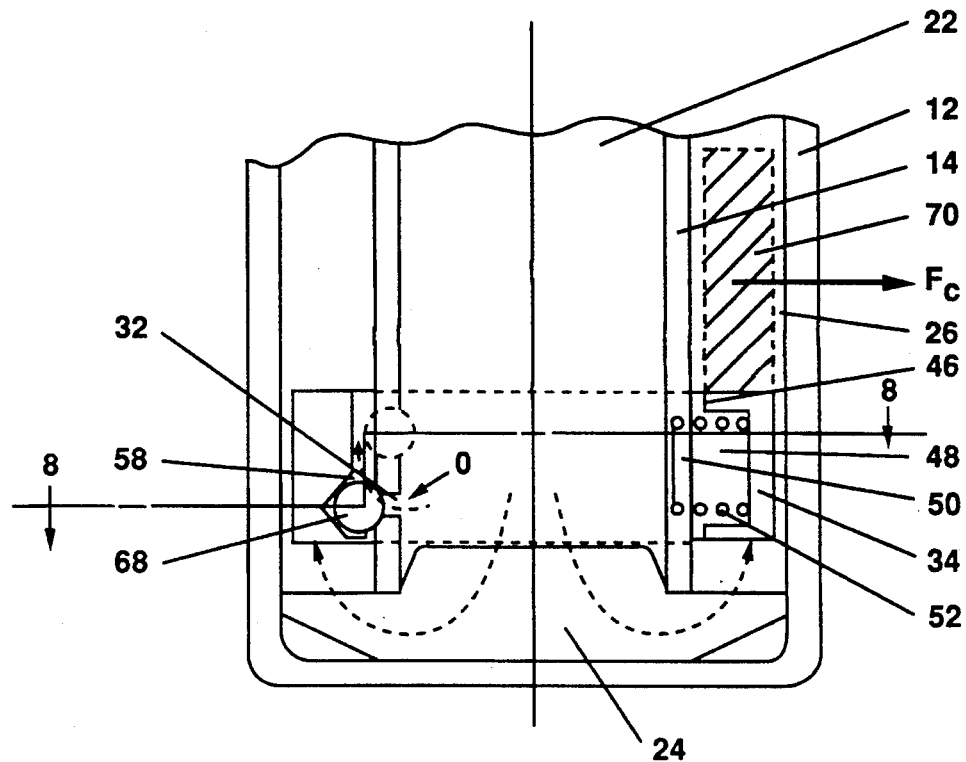
FIG. 7 is a part fragmentary cross sectional view of a second embodiment of a shock absorber according to the present invention.
Figure 8:
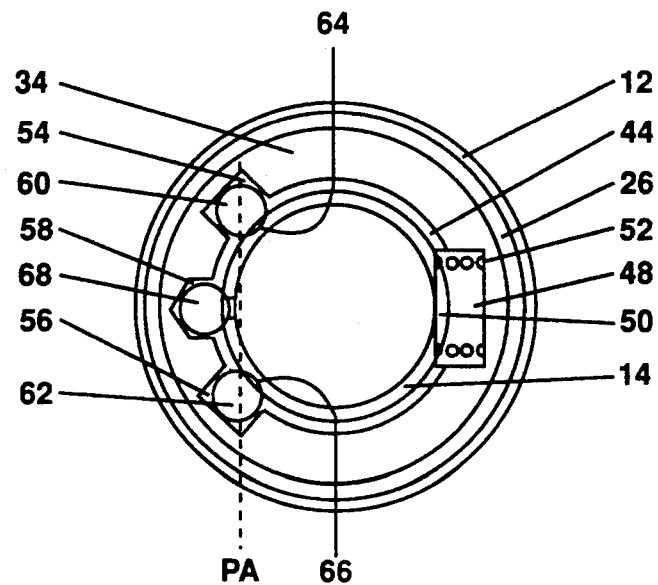
FIG. 8 is a top plan view of the shock absorber of FIG. 7.

FIGS. 7 and 8 show a second embodiment of the invention using the same numerals as used in figures 1 and 2 to represent corresponding components. In this embodiment, there is only a single orifice 32 in the wall of chamber 14. Additionally, ring 34 is not sealingly fitted around the outer periphery of chamber 14 but is separated therefrom by an annular space 44 defined between the inner surface 46 of ring 34 and chamber 14 allowing ring 34 to laterally move within oil reservoir 26. Ring 34 has a recess 48 in an internal wall thereof which is directly opposite a recess 50 in the wall of chamber 14. A spring 52 is disposed in recesses 48, 50 connecting chamber 14 to ring 34, and biasing recess 48 away from recess 50.

Ring 34 also has 3 notches 54, 56, 58 in its innner surface 46 which are opposite recess 48. Spheres 60, 62 are received in notches 54, 56, respectively, and are also received in notches 64, 66, respectively, which are in the wall of chamber 14. In this configuration, ring 34 is suspended by spheres 60, 62 as well as spring 52, and can be pivoted about an axis PA which passes through spheres 60, 62. Sphere 68 is received in notch 58 and also provides suspension support to ring 34. In addition, when the damping control of the shock absorber is in an inactive state, sphere 58 is pressed into orifice 32 by the resiliency of spring 52 acting on ring 34, thereby preventing fluid from passing through orifice 32. However, as further described hereinbelow, when ring 34 pivots about axis PA, sphere 68 moves away from orifice 32 allowing fluid from lower chamber 22 to enter into oil reservoir 26.

In operation, when the shock absorber housing 10 is subjected to a strong upward impact which is sufficent to overcome the bending stiffness of spring 52, ring 34 will pivot about axis PA and spring 52 will bend. During the pivoting, sphere 68 moves out of orifice 32 and away from the wall of chamber 14. Fluid from lower chamber 22 then passes through orifice 32 and into oil reservoir 26 which lowers the compressive damping factor of the shock absorber. Once the shock absorber is no longer subject to the strong impact force, the resiliency of the spring 32 will force it to return to its normal position, corespondingly forcing ring 34 to pivot in the reverse direction about axis PA until the sphere 68 moves back into orifice 32 and deactivates the damping control valve. Accordingly, sphere 68 and orifice 32 operate as a check valve. Furthermore, while spring 52 bends when subject to a sufficient impact force, it has sufficent axial stiffness to prevent the fluid pressure in lower chamber 22 from forcing sphere 68 out of orifice 32 so that the damping control valve will not be activated due to this pressure.

A mass 70 can be attached to ring 34 within oil reservoir 26. Mass 70 allows the damping valve to be activated and deactivated when the shock absorber 10 is accelerated in a direction which is transverse to the longitudinal axis of the shock absorber housing 12. If the shock absorber 10 is under a centrifugal force Fc, due to the acceleration experienced during vehicle turning, mass 70 will attempt to move in the direction of the force Fc. Thus, mass 70 and ring 34 act pivotally within oil reservoir 26 and sphere 68 is kept against orifice 32 to deactivate the damping valve. On the other hand, if the vehicle turns in the opposite direction, the centrifugal force will be opposite to that depicted by Fc, and the ring 34 and mass 70 will pivot about axis PA and correspondingly, sphere 68 will move out of orifice 32 thereby activating the damping valve.

While the above describes the activation/deactivation of the check valve under the influence of an acceleration created by the turning of a vehicle, it is readily understood that the check valve will operate in a similar fashion when there is a fore or aft acceleration such as that experienced during the acceleration or braking of a vehicle. In this situation, ring 34, mass 70 and sphere 68 will all move in a direction which is transverse to the lateral movement described above.

The second described embodiment can also be modified to double the flow rate of fluid from the lower chamber 22 to the oil reservoir 26 by reversing the functions of the respective spheres. That is, if spheres 60, 62 are designed to cooperate with a respective orifice as check valves, and sphere 68 acts as a pivoting sphere, the flow rate will be doubled.

The above described second embodiment has all of the advantages associated with the first embodiment but does not require high manufacturing tolerances. Furthermore, the second embodiment will not clog easily, is not prone to wear, and can optionally be activated by lateral or fore-aft accelerations, as well as by an impactive vertical force.

A clear advantage of the second embodiment occurs when cornering. In this case, a significant weight transfer to the outside-of-the-turn vehicle suspension make its damping force most influential on the vehicle handling performance. By properly selecting the lateral sensitivity of this embodiment, the inertia valve can be inhibited from reacting to the vertical impacting forces under side acceleration which results in high damping capability during cornering.

Another important result of inhibiting reduction of damping due to road impacts to the outside-of-the-turn suspension is that the suspension side inside-of-the-turn is conversely encouraged to reduce its damping more so than in the absence of lateral accelerations. The inside-of-the-turn suspension becomes softer than without lateral acceleration, since lateral acceleration tries to decrease damping.) The combined effect for the total vehicle is that in a rough turn the outer suspension does not collapse (as a result of sequential impacts), but the inner suspension does tend to collapse resulting in a decreased amount of body roll. This type of effect is currently only achievable with active suspension.

The foregoing is intended to illustrate the present invention without limiting its scope. Clearly numerous additions, substitutions and other changes can be made to the invention without altering the scope thereof as set forth in the appended claims. For example, the inertial valve may be incorporated into the existing elements of a conventional fluid pressure valve between the upper and lower chambers, rather than as a separate valve between the lower chamber and the reservoir. Also, the inertial valve may be oriented along the longitudinal axis of the vehicle, rather than vertically, to be activated by the recessional acceleration of the wheels during impact or their precessional recovery.

What is claimed is:

1. An apparatus, comprising:
    a shock absorber housing containing a damping chamber housing defining a damping chamber;
    a shock absorber piston mounted for movement in said damping chamber; and
    an inertia operated damping control valve in said shock absorber housing for altering a damping factor of said piston movement in said damping chamber in response to an acceleration of said shock absorber transverse to a longitudinal axis of said shock absorber housing, said inertia operated damping control valve comprising an actuation member loosely fitted around said damping chamber housing to permit movement of said actuation member laterally and longitudinally of said damping chamber housing, an orifice in said damping chamber housing, a movable valve member positioned between said actuation member and said orifice to normally cover said orifice, and a biasing member for biasing said actuation member toward said valve member.

2. An apparatus according to claim 1 wherein said damping chamber housing is inside said shock absorber housing to form an oil reservoir and a fluid pressure responsive base valve for communicating said damping chamber with said oil reservoir during compressive damping, and wherein said inertia operated damping control valve comprises a second passage between said damping chamber and said oil reservoir for reducing the damping factor during the occurrence of said acceleration or an impact force.

3. An apparatus including a shock absorber, said apparatus comprising:
    a shock absorber housing containing a damping chamber;
    a shock absorber piston mounted for movement in said damping chamber; and
    an inertia operated damping control valve in said shock absorber housing or altering a damping factor of said piston movement in said damping chamber in response to an acceleration of said shock absorber transverse to a longitudinal axis of said shock absorber housing,
    wherein said inertia operated control valve also alters said damping factor of said piston movement in said damping chamber in response to an impactive force parallel to said longitudinal axis.

4. An apparatus according to claim 3 wherein said damping chamber is defined by a cylindrical housing and said inertia operated damping control valve comprises an orifice in said cylindrical housing, a movable valve member surrounding said cylindrical housing and mounted to cover or uncover said orifice and a resilient member for biasing said movable valve member over said orifice.

5. An apparatus according to claim 4 wherein said cylindrical housing is oriented generally vertically and said resilient member is positioned between said movable member and said cylindrical housing.

6. An apparatus according to claim 3 wherein said piston is sealed against said chamber to divide said chamber into an upper chamber and a lower chamber, and including a fluid pressure responsive piston valve mounted to said piston for communicating said upper chamber to said lower chamber.

7. An apparatus according to claim 3 including a further valve system for producing normal compression and extension damping factors in the absence of said transverse acceleration.

8. An apparatus as claimed in claim 7 wherein said inertia operated damping control valve causes said shock absorber to assume said normal damping factors during certain transverse accelerations.

9. A method, comprising:
    damping shocks in a vehicle using a shock absorber having a first compression damping factor which is effective below a predetermined level of acceleration of said shock absorber which is transverse to a longitudinal axis of said shock absorber and a reduced second damping factor during the occurrence of road impacts applied in a substantially vertical direction; and
    causing a transverse acceleration greater than said predetermined level to actuate an inertia valve in said shock absorber to cause said shock absorber to assume said first compression damping factor.

10. A method according to claim 9, wherein said shock absorber comprises an extension damping factor which is substantially the same as said first compression damping factor.

11. An apparatus, comprising:
- a shock absorber housing containing a damping chamber defined by a cylindrical housing;
- a shock absorber piston mounted for movement in said damping chamber; and
- an inertia operated damping control valve in said damping chamber for altering a damping factor of said piston movement in said damping chamber in response to a substantially vertical impactive force including
- an orifice in said cylindrical housing,
- a pivotable valve member mounted to cover or uncover said orifice, and
- a resilient member for biasing said pivotable valve member over said orifice.

12. An apparatus according to claim 11 wherein said cylindrical housing is oriented generally vertically and said resilient member is positioned between said pivotable member and said cylindrical housing.

13. An apparatus according to claim 11 wherein said cylindrical housing forms an oil reservoir and a fluid pressure responsive base valve is disposed at the bottom of said reservoir for communicating said damping chamber with said oil reservoir.

14. An apparatus according to claim 13 wherein said piston is sealed against said damping chamber to divide said damping chamber into an upper chamber and a lower chamber, and including a fluid pressure responsive piston valve mounted to said piston for communicating said upper chamber to said lower chamber.

15. An apparatus according to claim 11 including a further valve system for producing a compression and extension damping factors in the absence of said impactive force.

16. An apparatus as claimed in claim 15 wherein said inertia operated damping control valve reduces the compression damping factor during said impactive force.

* * * * *